(12) United States Patent
Lee (10) Patent No.: US 7,471,804 B2
(45) Date of Patent: *Dec. 30, 2008

(54) FLAT PANEL MONITOR FRAME WITH INTEGRAL SPEAKERS

(75) Inventor: Noel Lee, Las Vegas, NV (US)

(73) Assignee: Monster Cable Products, Inc., Brisbane, CA (US)

( * ) Notice: Subject to any disclaimer, the term of this patent is extended or adjusted under 35 U.S.C. 154(b) by 724 days.

This patent is subject to a terminal disclaimer.

(21) Appl. No.: 10/753,066

(22) Filed: Jan. 6, 2004

(65) Prior Publication Data

US 2005/0047617 A1 Mar. 3, 2005

Related U.S. Application Data

(63) Continuation-in-part of application No. 10/655,494, filed on Sep. 3, 2003.

(51) Int. Cl.
*H04R 25/00* (2006.01)
*H04N 5/64* (2006.01)
*A47B 5/00* (2006.01)
*A47B 81/06* (2006.01)

(52) U.S. Cl. ............... 381/388; 381/333; 348/836; 312/7.2

(58) Field of Classification Search ........... 381/301, 381/306, 87, 332–333, 152, 190–191, 426, 381/431, 388, 300, 386, 335; 348/789, 795–797, 348/818–843, 794; 312/7.2, 245; 361/681–682; 40/594, 725, 768, 312, 773, 124.04; 248/917–924
See application file for complete search history.

(56) References Cited

U.S. PATENT DOCUMENTS 2,596,710 A * 5/1952 Moricco et al. ............ 312/7.2

| 3,650,584 | A | * | 3/1972 | Goetz et al. ................. 312/7.2 |
| 4,410,761 | A | * | 10/1983 | Schickedanz ................ 386/97 |
| 4,646,349 | A | * | 2/1987 | Puls ......................... 381/306 |

(Continued)

FOREIGN PATENT DOCUMENTS

FR 2802753 A1 * 6/2001

(Continued)

OTHER PUBLICATIONS

Martin Williams. "JES '96—Sony Intros First Plasmatron Home TV Oct. 1, 1996", Newsbytes News Network, Oct. 1, 1996.*

(Continued)

*Primary Examiner*—Curtis Kuntz
*Assistant Examiner*—Phylesha L Dabney
(74) *Attorney, Agent, or Firm*—LaRiviere, Grubman & Payne, LLP (57) ABSTRACT

A flat panel monitor frame (10) with integrated speakers (26) as well as planar speakers (50*a*, 50*b*, 50*c*) for facilitating a consumer's selection of an aesthetic visual effect and for enhancing an acoustic experience for a flat panel monitor (22), having user-detachable and replaceable trim (36) for facilitating blending of the frame (10) and flat panel monitor (22) into the room decor, and having an array of speakers (26) within at least one frame side (12, 14, 16, 18), reducing the need for additional floor or wall-mounted speakers.

18 Claims, 8 Drawing Sheets

U.S. PATENT DOCUMENTS

| | | | | |
|---|---|---|---|---|
| 4,658,188 | A * | 4/1987 | Bohmer | 315/366 |
| 4,998,283 | A * | 3/1991 | Nishida et al. | 381/388 |
| 5,025,474 | A * | 6/1991 | Tanaka et al. | 381/333 |
| 5,027,403 | A * | 6/1991 | Short et al. | 381/306 |
| 5,166,802 | A * | 11/1992 | Thiele et al. | 348/836 |
| 5,264,765 | A * | 11/1993 | Pecorino et al. | 318/265 |
| 5,818,950 | A * | 10/1998 | Sakamoto et al. | 381/420 |
| 5,822,443 | A * | 10/1998 | Kim | 381/388 |
| 5,868,475 | A * | 2/1999 | Shikata et al. | 312/7.2 |
| 5,903,657 | A * | 5/1999 | Chuo | 381/388 |
| 6,137,891 | A * | 10/2000 | Porrazzo et al. | 381/408 |
| 6,151,084 | A * | 11/2000 | Goto et al. | 348/835 |
| 6,169,809 | B1 * | 1/2001 | Azima et al. | 381/152 |
| 6,266,426 | B1 * | 7/2001 | Azima et al. | 381/152 |
| 6,298,942 | B1 * | 10/2001 | Schlatmann et al. | 181/144 |
| 6,480,243 | B2 * | 11/2002 | Yamamoto | 348/836 |
| 6,590,994 | B2 * | 7/2003 | Tanase et al. | 381/431 |
| 6,628,793 | B1 * | 9/2003 | Porzilli et al. | 381/182 |
| 6,807,051 | B2 * | 10/2004 | Takahashi | 361/681 |
| 6,826,863 | B1 * | 12/2004 | Goodfellow | 40/725 |
| 6,843,542 | B2 * | 1/2005 | Bressan et al. | 312/7.2 |
| 6,918,461 | B2 * | 7/2005 | Christie | 181/148 |
| 6,988,339 | B2 * | 1/2006 | Pylkki et al. | 52/173.3 |
| 6,999,595 | B2 * | 2/2006 | Anderson et al. | 381/333 |
| 7,120,011 | B2 * | 10/2006 | Takahashi et al. | 361/681 |
| 2001/0026625 | A1 * | 10/2001 | Azima et al. | 381/152 |
| 2003/0159879 | A1 * | 8/2003 | Christie | 181/148 |
| 2004/0131211 | A1 * | 7/2004 | Miyata et al. | 381/152 |
| 2005/0002537 | A1 * | 1/2005 | Azima et al. | 381/152 |
| 2005/0031144 | A1 * | 2/2005 | Mizuno et al. | 381/306 |
| 2005/0105747 | A1 * | 5/2005 | Miyata et al. | 381/152 |
| 2005/0105748 | A1 * | 5/2005 | Bartell | 381/306 |
| 2005/0122439 | A1 * | 6/2005 | Chang | 348/834 |
| 2005/0200765 | A1 * | 9/2005 | Sanchez | 348/818 |
| 2006/0150462 | A1 * | 7/2006 | Rossi | 40/700 |
| 2006/0238446 | A1 * | 10/2006 | Takahashi et al. | 345/55 |
| 2007/0046841 | A1 * | 3/2007 | Jacobsmeyer et al. | 348/836 |

FOREIGN PATENT DOCUMENTS

| | | | |
|---|---|---|---|
| JP | 2006129412 A | * | 5/2006 |
| WO | WO 2004014071 A1 | * | 2/2004 |

OTHER PUBLICATIONS

Ellen Walravens and Audrey Webb, "Final Sound Introduces New Line of Flat Wall-Mount Speakers for Home Theater", PR NEwswire, Dec. 19, 2002, p. 1.*

* cited by examiner

FLAT PANEL MONITOR FRAME WITH INTEGRAL SPEAKERS

CROSS-REFERENCE TO RELATED APPLICATION(S)

This application is a continuation-in-part application of, and claims priority from, co-pending U.S. Ser. No. 10/655,494, entitled "FLAT PANEL MONITOR FRAME," filed on Sep. 3, 2003, and incorporated herein by reference.

TECHNICAL FIELD

The present invention relates to a mounting frame for a flat panel monitor, and more particularly, to a flat panel monitor frame including integral speakers. In particular, the present invention relates to a monitor frame which is particularly well-suited for residential use, or use in any surroundings where an opulent or furniture-like use is desired.

BACKGROUND ART

Flat panel monitors, or flat panel television sets, for example, plasma monitors or liquid crystal display (LCD) monitors, are becoming increasingly popular for residential use. Such monitors provide extremely high quality pictures, and a fit within an envelope only slightly larger than the screen itself. The small envelope allows flat panel monitors to be used in many locations where a conventional television would require too much space or would detract from the overall ambiance of the room. Unfortunately, known flat panel monitors have a harsh appearance that does not coordinate well within many home decorating schemes. Further, additional speakers are often required to enhance the sound experience associated with visual entertainment, i.e., multi-channel sound, and such speakers also do not coordinate well with the home decorating scheme. Accordingly, there is a need for a method and an apparatus that softens the appearance of flat panel monitors, while also providing additional speakers.

DISCLOSURE OF INVENTION

The present invention addresses the foregoing needs as well as other needs by providing a flat panel monitor frame with integrated speakers, having a feature for providing an aesthetic visual effect and an enhanced acoustic experience, for either a wall-mounted or table-supported flat panel monitor. The flat panel monitor frame seamlessly blends the otherwise cold appearance of the flat panel monitor into a room decor via the feature for providing an aesthetic visual effect which includes user-detachable and replaceable trim pieces to facilitate the consumer's blending of the flat panel monitor into the room decor. The flat panel monitor frame further includes an array of speakers along at least one frame side. The speakers thus provided reduce the need for additional floor or wall-mounted speakers. In a preferred embodiment, the flat panel monitor frame is sized to accept up to a 50-inch flat panel monitor. The flat panel monitor frame is mounted to the wall independently of the monitor being mounted to the wall.

In accordance with one aspect of the invention, a flat panel monitor frame is provided, including frame sections suitable for bordering a flat panel monitor, the frame sections comprising: a frame top; a frame right side extending downward from the frame top; and a frame left side extending downward from the frame top. The frame sections are preferably comprise aluminum, and more preferably comprise extruded aluminum. The flat panel monitor frame further includes at least one speaker residing in the sections, and a feature for electrically connecting the speaker to a source of at least one speaker signal associated with the flat panel monitor.

The flat panel monitor frame further includes speakers in the frame right side, the frame left side, the frame top, and when the flat panel monitor frame sections include a frame bottom, the frame bottom. The speakers are either high-frequency speakers, commonly called "tweeters" or mid-range speakers. The speakers are mounted directly to the metal frame sections or to baffles residing within the frame sections, wherein the baffles preferably comprise wood, and more preferably comprise medium density fiberboard (MDF). The flat panel monitor frame further includes electrical circuits for filtering speaker signals, commonly called low-pass filters, band-pass filters or cross-over networks, wherein such electrical circuits reside on printed circuit boards (PCBs). The signals are provided to speakers residing in the flat panel monitor frame or to additional speakers mounted apart from the flat panel monitor frame. The speakers are covered by removable grills; and other portions of the flat panel monitor frame are covered by removable trim. The flat panel monitor frame further includes a back support board, wherein the back support board preferably comprise wood, and more preferably comprise MDF. The back support board is constructed to provide both suitable ventilation and monitor-mounting convenience. The flat panel monitor is preferably mounted through the back support board using standard mounting brackets, i.e., either manufacturer-supplied mounting brackets or after-market mounting brackets.

One embodiment of the present invention involves a frame system for a flat panel monitor, the frame system having a frame comprising: a frame top; a frame bottom; a frame right side connected between the frame top and the frame bottom; and a frame left side connected between the frame top and the frame bottom. The frame system further includes a back support board attached to the frame, wherein the back support board is suitable for supporting the flat panel monitor, and speakers residing in the speaker portion of the frame. In-view surfaces of the frame include a speaker portion and a trim portion. The speaker portion is covered by removable and replaceable grills; and the trim portion is covered by removable and replaceable trim to better facilitate the consumer in matching the appearance of the flat panel monitor frame to the room decor.

Another embodiment of the present invention involves a speaker and frame system for a flat panel monitor, including a frame comprising: a frame top; a frame bottom; a frame right side connected between the frame top and the frame bottom; and a frame left side connected between the frame top and the frame bottom. The frame right side houses a multiplicity of right speakers, the frame left side houses a multiplicity of left speakers, and the frame top houses a multiplicity of top speakers.

Yet another embodiment of the present invention involves a speaker and frame system for a flat panel monitor, including planar speakers, for example, ribbon speakers, quasi-ribbon speakers, electrostatic loudspeakers (ESL), distributed mode loudspeakers (DML), and the like. Planar speakers differ from conventional speakers in that planar speakers have a substantially flat, planar, or sheet-like transducer element, while conventional speakers have a conical transducer element. Due to the flat transducer element, planar speakers do not require the depth of a speaker having a conical transducer element, and, thus, are advantageous for use in applications with limited depth. In one preferred embodiment, planar speakers acting as acoustic dipoles, e.g., radiating in both a frontal direction and a rearward direction, are positioned by mounting the planar speakers in an enclosed space within an enclosed volume with a highly efficient absorber disposed behind them.

Planar speakers are either used alone or in combination with conventional speakers. For example, in one embodiment, one planar speaker resides in the frame right side while another planar speaker resides in the frame left side. In another embodiment, planar speakers are combined with conventional speakers in the frame sides. In still another embodiment, planar speakers reside in the frame top and possibly the frame bottom, and are combined with conventional speakers in the frame top and possibly frame bottom. In some instances, a planar speaker signal processing circuit resides in the speaker sides, top, and possibly bottom. Other features of the present invention are disclosed, or are apparent in the section entitled "Detailed Description of the Invention," disclosed, infra.

BRIEF DESCRIPTION OF THE DRAWING

For a better understanding of the present invention, reference is made to the below-referenced accompanying Drawing. Reference numbers refer to the same or equivalent parts of the present invention throughout the several figures of the Drawing.

MODES FOR CARRYING OUT THE INVENTION

The following description is of the best mode presently contemplated for carrying out the invention. This description is not to be taken in a limiting sense, but is made merely for the purpose of describing a preferred embodiment of the invention. The scope of the invention should be determined with reference to the claims.

The present invention provides a flat panel monitor frame with integrated speakers. The flat panel monitor frame seamlessly blends the otherwise cold appearance of the flat panel monitor into a room decor, and includes user detachable and replaceable trim pieces to facilitate blending the flat panel monitor into the room decor. The flat panel monitor frame further includes speakers residing in at least one frame section.

Figure 1:
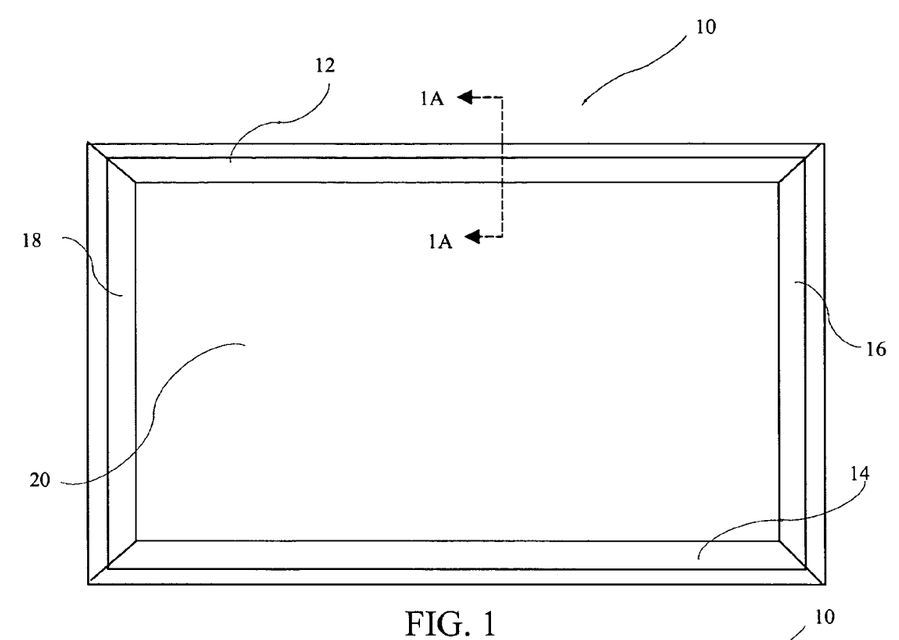
FIG. 1 is a front view of a flat panel monitor frame according to the present invention.

FIG. 1 illustrates, in a frontal view, a flat panel monitor frame according to the present invention. In particular, FIG. 1 shows a flat panel monitor frame 10. The frame perimeter comprises frame sections including a frame top 12, a frame bottom 14, a frame right side 16, and a frame left side 18. The frame sections preferably comprise aluminum, and more preferably comprise extruded aluminum. A back support board 20 is attached to the back of the frame sections. The back support board 20 preferably comprises a wood material and more preferably comprises an MDF.

Figure 2:
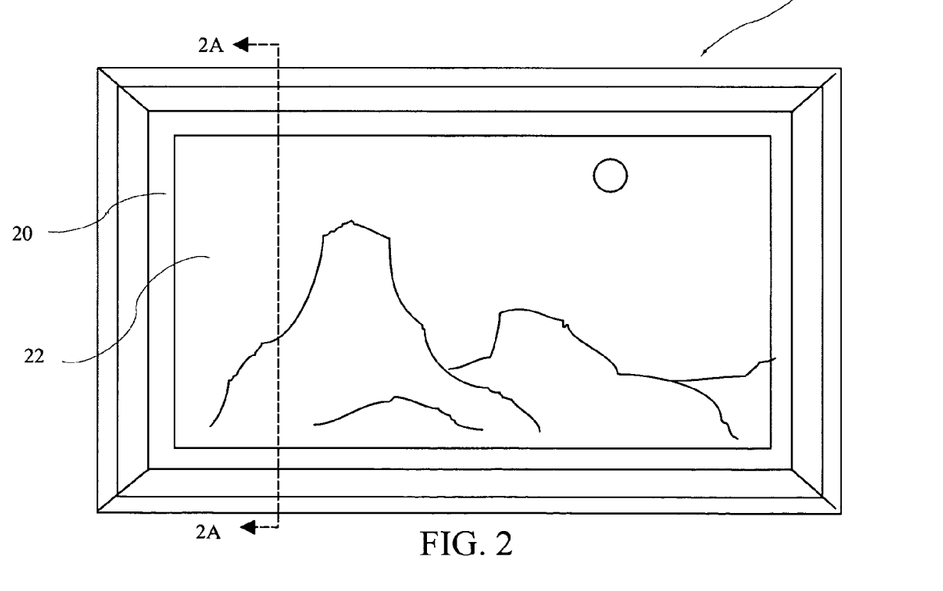
FIG. 2 is a front view of a flat panel monitor, displaying a scene, mounted within the flat panel monitor frame of FIG. 1.

FIG. 2 illustrates, in a frontal view, a flat panel monitor 22, displaying a scene, mounted within the flat panel monitor frame 10, having the back support board 20, of FIG. 1.

Figure 3A:
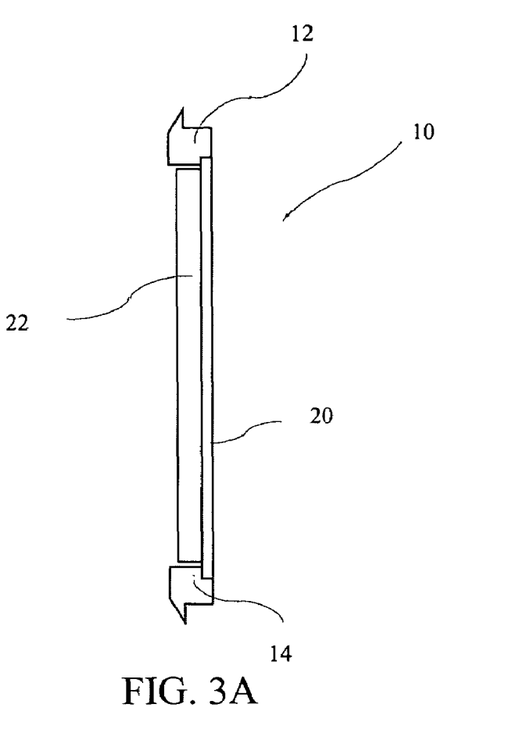
FIG. 3A shows a cross-sectional view of the flat panel monitor in the flat panel monitor frame, taken along line 2A-2A of FIG. 2, including a back support board.

FIG. 3A shows, in a cross-sectional view, the flat panel monitor 22 in the flat panel monitor frame 10, taken along cross-section 2A-2A of FIG. 2, including the back support board 20. Back support board 20 is attached to the frame sections 12, 14. The flat panel monitor 22 is preferably supported using standard mounting brackets, for example either manufacturer-supplied mounting brackets or other after-market brackets. The back support board 20 is provided with a pre-formed opening suitable for standard support brackets (not shown). Alternatively, openings are created in the back support board 20 suitable for standard support brackets (not shown).

Figure 3B:
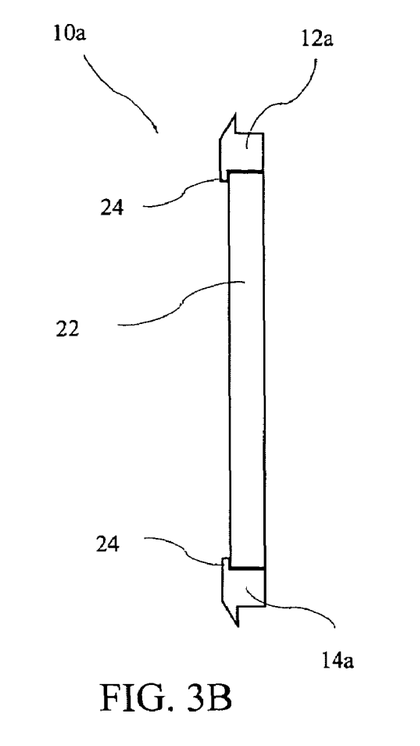
FIG. 3B depicts an alternative embodiment cross-sectional view of the flat panel monitor frame, taken along line 2A-2A of FIG. 2, wherein the flat panel monitor is mounted to a vertical surface, and the flat panel monitor frame is mounted over the monitor.

FIG. 3B shows, in a cross-sectional view taken along cross-section 2A-2A of FIG. 2, an alternative flat panel monitor frame 10a being mounted over the flat panel monitor 22. The alternative flat panel monitor frame 10a includes second frame top 12a and frame bottom 14a having a flange 24 which extends inwardly over the front of the flat panel monitor 22 to provide a more finished appearance.

Figure 4:
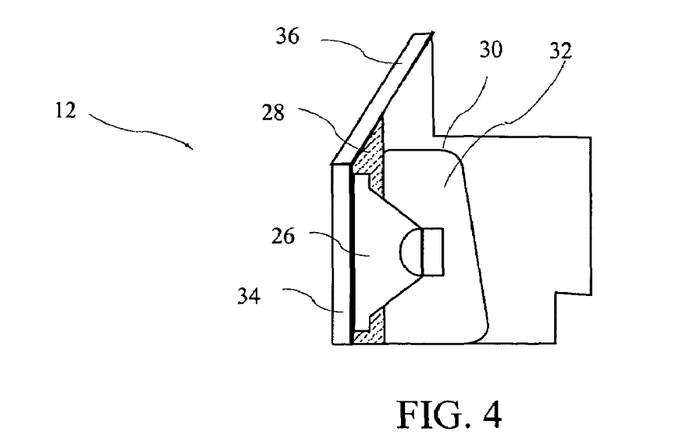
FIG. 4 is a detailed cross-sectional view of an example of a frame top of the flat panel monitor frame taken along line 1A-1A of FIG. 1, wherein a speaker is shown housed in the frame top.

FIG. 4 illustrates, in a detailed cross-sectional view, an example of a frame top 12 of the flat panel monitor frame 10 taken along a cross-section 1A-1A of FIG. 1, wherein a speaker 26 is shown housed in the frame top 12. The profile of the cross-section is for example only and various profiles are intended to come within the scope of the present invention. The cross-section shows a speaker 26 being mounted to a baffle 28; and the speaker 26 is also mounted directly to the frame section in which the speaker 26 resides. The speaker 26 is a high-frequency speaker, i.e., a tweeter, or a mid-range frequency speaker. Baffle 28 is preferably constructed from a wood material, and more preferably from MDF. Speaker 26 is enclosed by speaker enclosure 30, thereby creating speaker volume 32. The front, e.g., visible or exposed, surface of the frame top 12 defines a speaker portion over the speaker 26, and a remaining portion hereafter called a trim portion. A grill 34 resides over the speaker portion. The grill 34 is preferably removable and replaceable by the consumer, wherein different appearances are obtained by using different grills. The grill 34 is cloth-covered, i.e., by grill cloth, metal-covered, or is a thin sheet of metal. In one embodiment, the grill 34 is made from arced perforated aluminum. Removable replaceable trim 36 resides over the trim portion, and the trim 36 is selected to provide a desired appearance.

Figures 5, 6, 7:
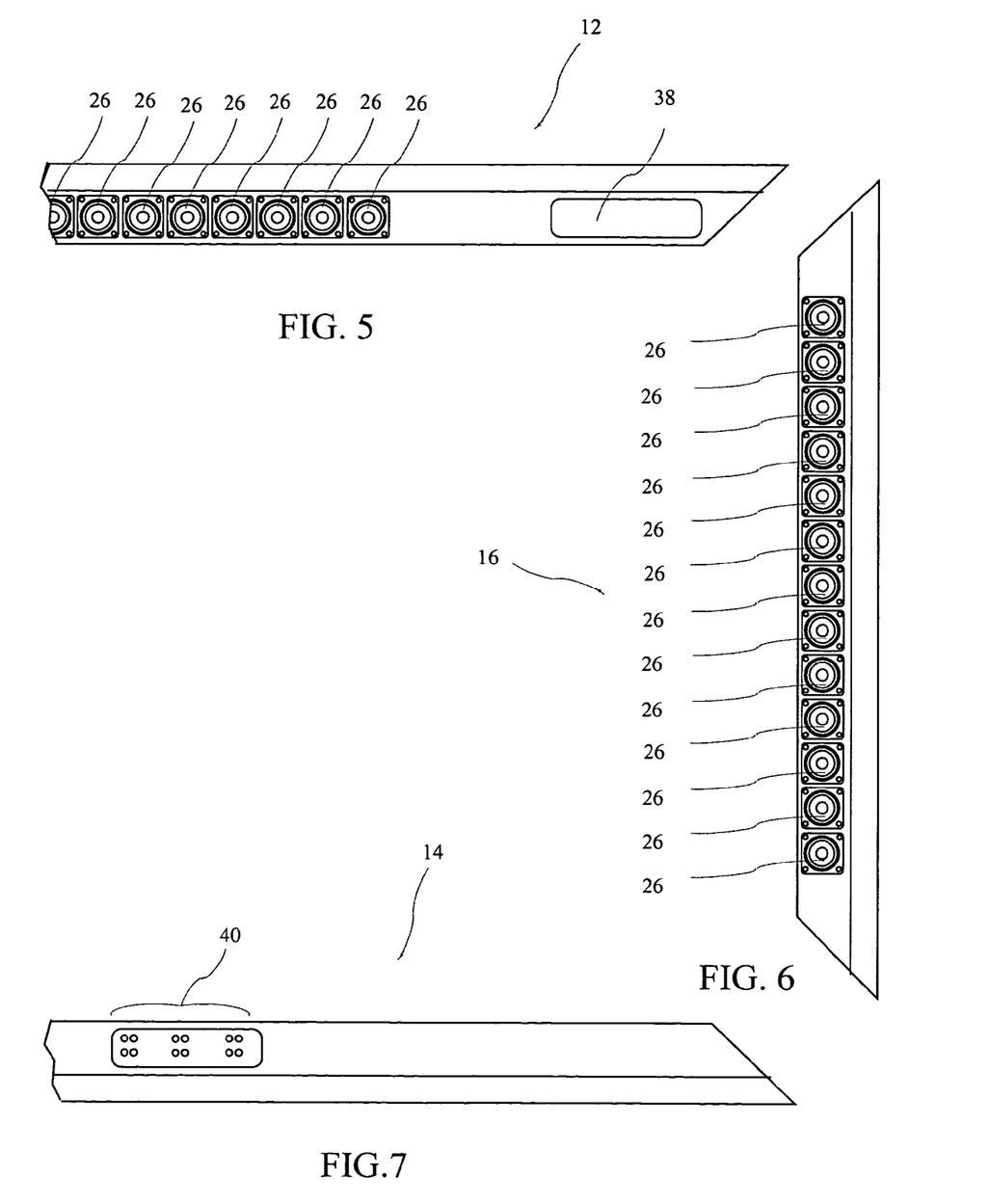
FIG. 5 is a frontal elevation view showing a multiplicity of speakers mounted in the frame top, and an electrical circuit for filtering a speaker signal for the speakers.
FIG. 6 is a frontal elevation view showing a multiplicity of speakers mounted in a frame right side.
FIG. 7 is a frontal elevation view showing speaker terminals mounted in a frame bottom.

FIG. 5 shows, in a frontal elevation view, a multiplicity of speakers 26 mounted in the frame top 12, and an electrical circuit 38 for filtering a speaker signal for the speakers. The multiplicity of speakers 26 are shown in a row configuration. The speakers 26 are high-frequency, mid-range speakers, or a mix of high-frequency and mid-range speakers. Although a single row of speakers 26 is shown, other embodiments include two or more rows of speakers 26, with high-frequency speakers and mid-range speakers in the same row or in different rows, and the speakers 26 are pointed in different directions. The circuit 38 typically comprises a band-pass filter designed to pass a speaker signal comprising a band of frequencies suitable for the speakers 26. If both high-frequency and mid-range speakers are present, the circuit 38 provides two or more outputs matched to each group of speakers. Such circuits are collectively termed a "cross-over network."

Additionally, the circuit 38 includes power conditioning, e.g., surge protection, and audio/visual (AN) processing. For example, the circuit 38 includes one or more of dts® 96/24 Decoding, dts®-ES Discrete 6.1 Decoding, dts® NEO 6: Music & Cinema Surround Decoding, Dolby® Digital EX 6.1 Surround Decoding, Dolby® Pro Logic II Music & Movie Surround Decoding, THX® surround EX Decoding, and the like. The circuit 38 also includes tuner functions, pre-amplifier functions, and power amplifier functions, and is capable of selecting input signals from a multiplicity of sources including antenna, cable, DVD, VCR, and the like. The circuit 38 further includes functions for displaying control information on the flat screen monitor 20 and for receiving remote control commands. The circuit 38 still further includes a capability for receiving remote control signals and to provide control signals to various components, for example, DVD players, solid state audio/video recording devices, video tape players, video signal processors, audio signal processors, and the like. Control functions are provided, for example, over an HDMI® interface, or a similar interface.

FIG. 6 illustrates, in a frontal elevation view, a multiplicity of speakers 26 mounted in a frame right side 16. A multiplicity of speakers 26 are arranged in a single column. The speakers 26 are high-frequency speakers, mid-range speakers, or a combination of high-frequency speakers and mid-range speakers. Other embodiments include two or more columns of speakers 26, with high-frequency speakers and mid-range speakers in the same column or in different columns, and the speakers are pointed in different directions. A separate circuit 38 is housed in the frame right side 16 to provide at least one speaker signal, the speaker signal is provided to the speakers 26 directly, or speaker signals is provided through another circuit housed in another part of the flat panel monitor frame 10. The circuit 38 residing in the frame right side 16 further provides any of the functions described for the circuit 38 with respect to FIG. 5. The frame left side 18 (FIG. 1) is generally substantially the mirror image of the frame right side 16.

FIG. 7 illustrates, in a frontal elevation view, speaker terminals 40 mounted in a frame bottom 14. The terminals 40 are preferably disposed on the back side of the frame bottom 14, i.e., out of view. The terminals 40 comprise a single pair of terminals for one channel of sound, two pairs of terminals for right and left channels of sound, or three pairs of terminals for right, left, and center channels of sound. The terminals 40 also comprise two pairs of terminals for each channel to allow bi-wiring. The frame bottom 14 alternatively includes speakers 26 and possibly circuit 38, as described with respect to FIG. 5 for the frame top 12.

Figure 8:
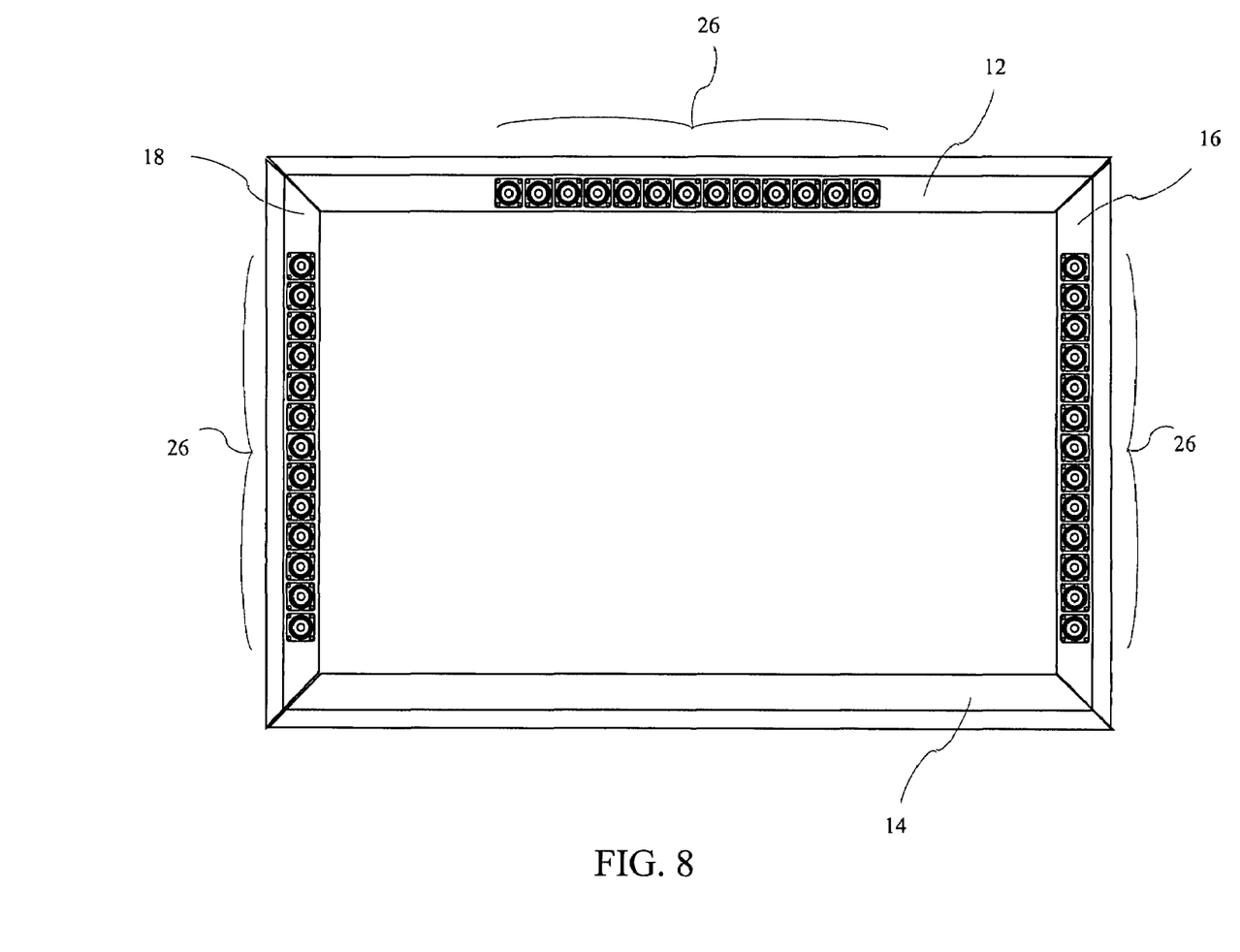
FIG. 8 is a frontal elevation view showing an example of a flat panel monitor frame, i.e., with the grill removed illustrating an example of a speaker arrangement.

FIG. 8 illustrates, in a frontal elevation view, an example of a flat panel monitor frame 10 with grill 34 removed to show an example of a speaker 26 arrangement. Specifically, FIG. 8 shows an example of a combination of the frame sections 12, 14, 16, 18. In this example, a multiplicity of speakers 26 are shown in the frame top 12, the frame right side 16, and the frame left side 18. The speakers 26 may be high-frequency speakers, mid-range speakers, or a combination of high-frequency and mid-range speakers. Speakers 26 alternatively reside in the frame bottom 14 in place of, or in addition to, the speakers 26 in the frame top 12. The number of speakers 26 residing in each frame section 12, 14, 16, 18 is preferably 13, but vary based on parameters including speaker size, frame size, desired audio performance, cost, or the like.

Figure 9:
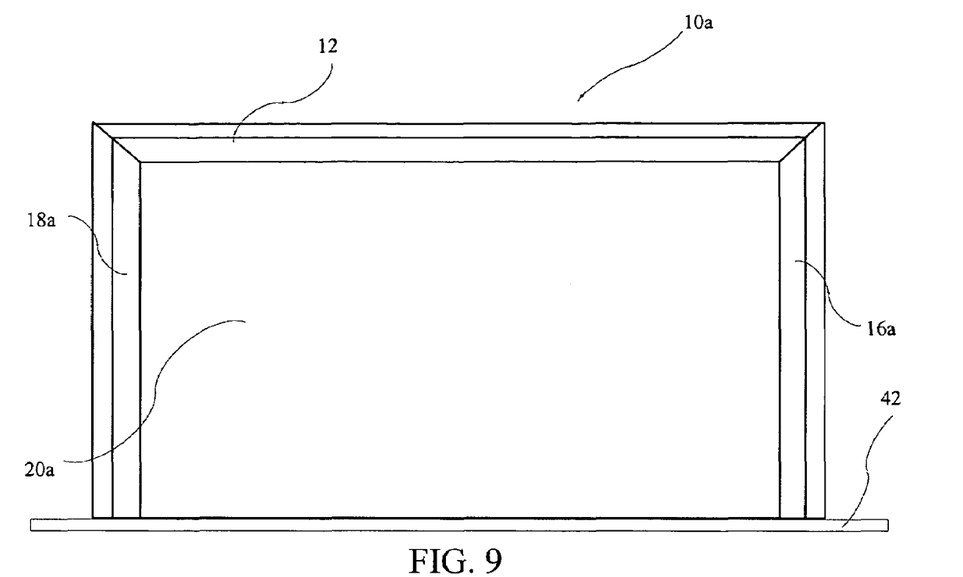
FIG. 9 is a front view of a second embodiment of a flat panel monitor frame adapted to rest on a table top.

FIG. 9 illustrates, in a frontal view, a second embodiment of a monitor 20*a* within a flat panel monitor frame 10*a* being adapted to rest on a table top 42. The flat monitor frame 10*a* cooperates with the table top 42 or any horizontal surface, for example, a shelf or the like. The flat panel monitor frame 10*a* includes the frame top 12, a second frame right side 16*a*, a second frame left side 18*a*, and a second back support board 20*a*.

Figure 10:
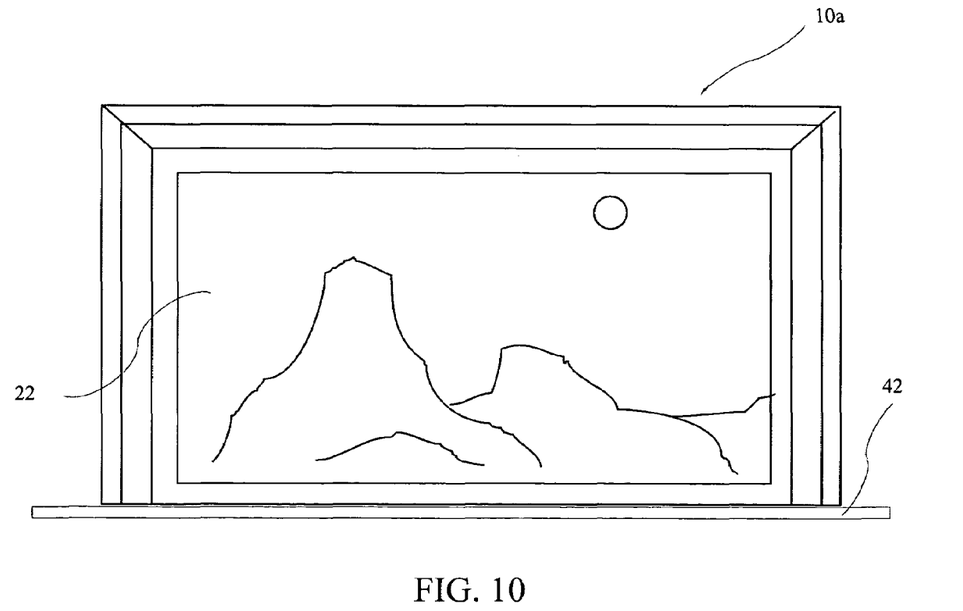
FIG. 10 is a front view of a flat panel monitor, displaying a scene, in the flat panel monitor frame of FIG. 9.

FIG. 10 illustrates, in a frontal view, a flat panel monitor 22, displaying a scene, in the flat panel monitor frame 10*a* of FIG. 9. In particular, FIG. 10 shows the flat panel monitor 22 and the flat panel monitor frame 10*a* resting on the table top 42. Furthermore, the combination of the flat panel monitor 22, displaying a scene, and the flat panel monitor frame 10*a* similarly cooperates with any suitable horizontal surface.

Figure 11:
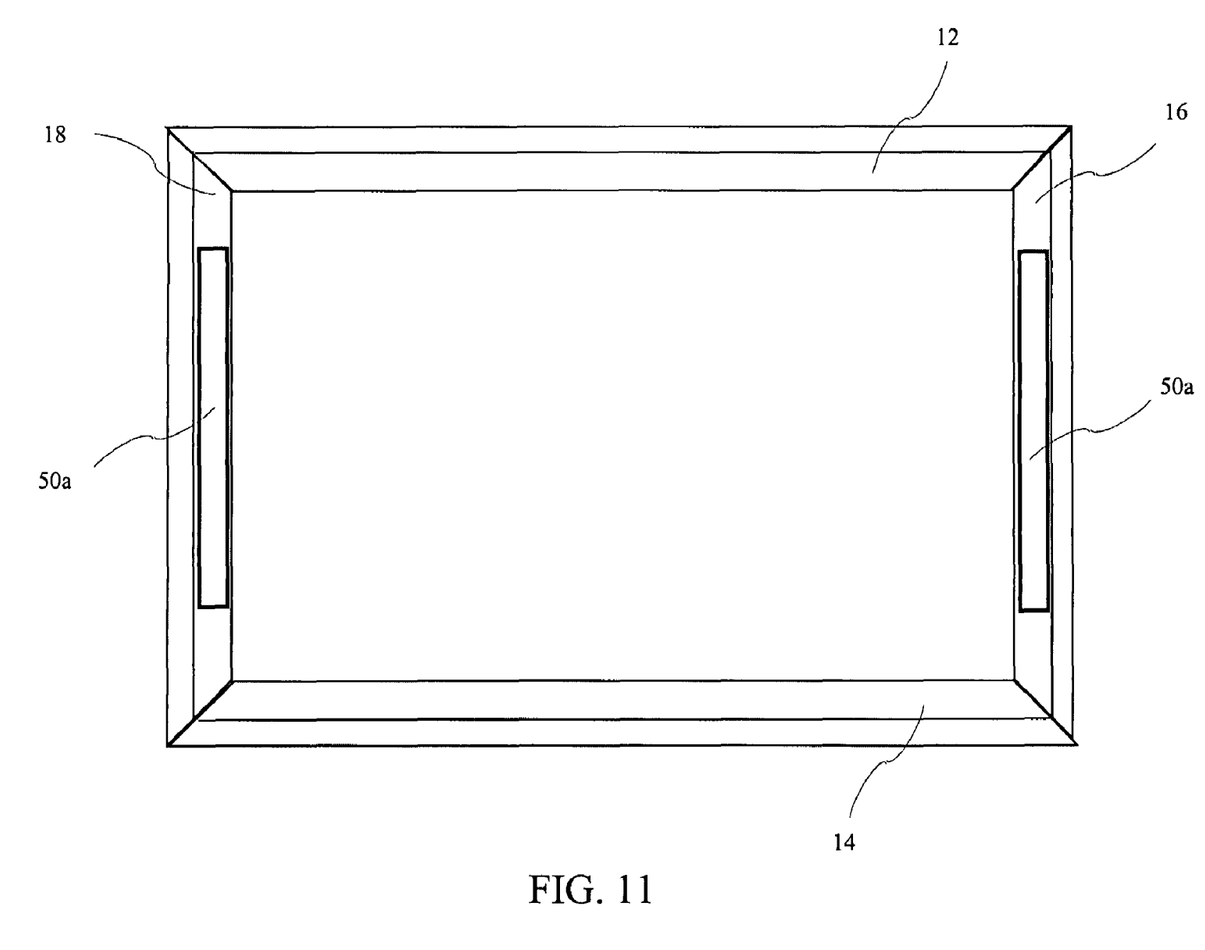
FIG. 11 is a frontal elevation view showing a flat panel monitor frame with planar speakers residing in the frame sides.

FIG. 11 illustrates, in a frontal elevation view, an embodiment wherein a flat panel monitor frame 10 with planar speakers 50*a* resides in the frame sides 16, 18. Specifically, FIG. 11 shows the flat panel monitor frame including first planar speakers 50*a* replacing the speakers 26 of FIG. 8. This embodiment comprises various planar speakers such as Magnaplanar® speaker manufactured by Magnepan®, White Bear®, MN®, the Planar Focus Technology (PFT™) speakers manufactured by Monsoon Audio®, ELS speakers manufactured by MartinLogan® in Lawrence, Kans., and the DML developed by NXT Technology® in London, United Kingdom. A flat panel monitor frame 10 including any planar speaker 50*a* is intended to come within the scope of the present invention.

Figure 12:
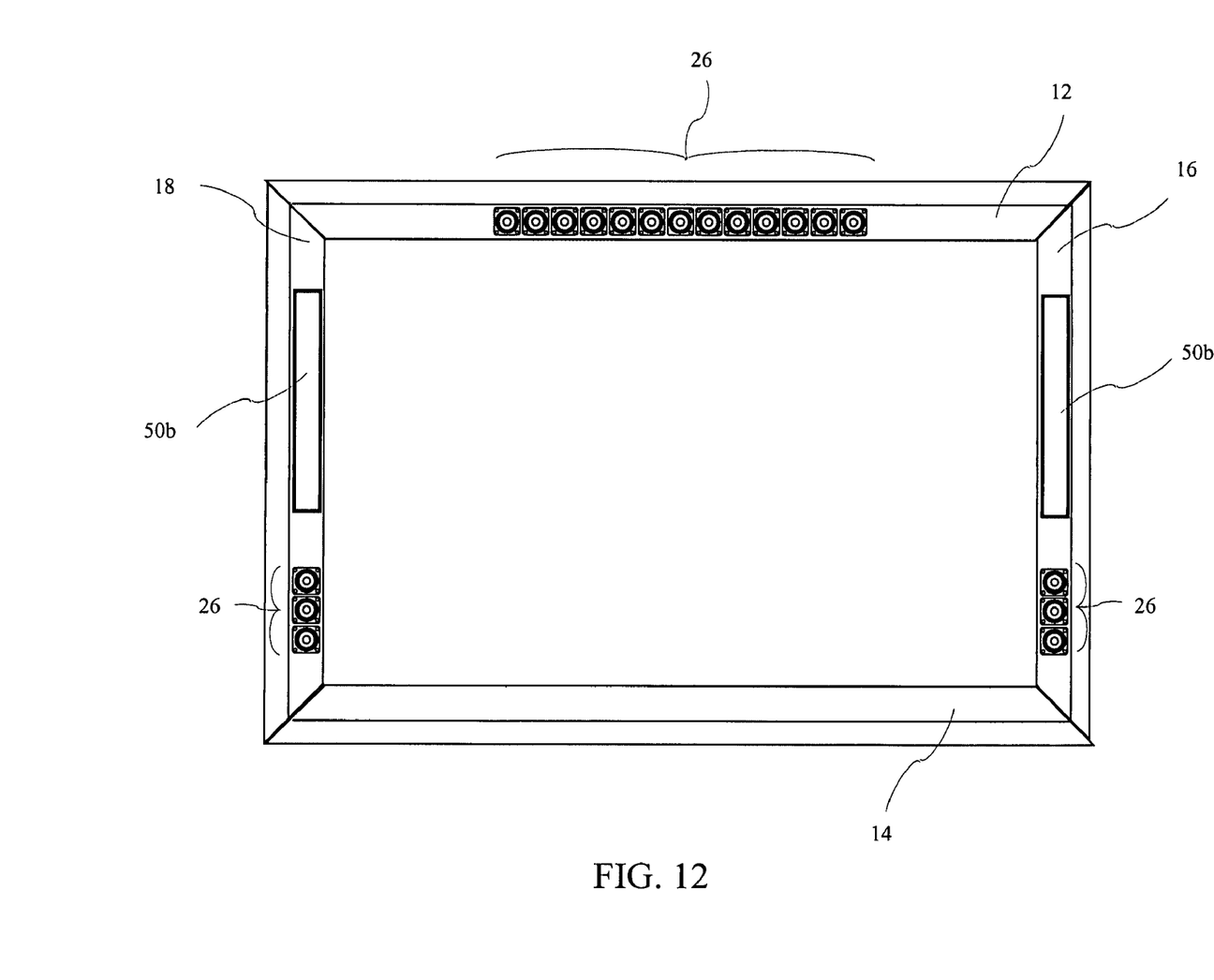
FIG. 12 is a frontal elevation view showing a flat panel monitor frame with planar speakers residing in the speaker frame sides, combined with conventional speakers residing in the frame sides and top.

FIG. 12 illustrates, in a frontal elevation view, an embodiment wherein a flat panel monitor frame 10 with planar speakers 50*b* residing in the speaker frame sides 16, 18, combined with conventional speakers 26 residing in the frame sides 16, 18 and top 12. In an embodiment with a combination of speakers, the planar speakers 50*b* are somewhat shorter than those in an embodiment with only planar speakers 50*a* (FIG. 11). Further, the speaker combination includes a row of speakers 26 in the frame top 12 to cooperate with planar speakers, either 50*a* or 50*b*, in the frame sides 16, 18.

Figure 13:
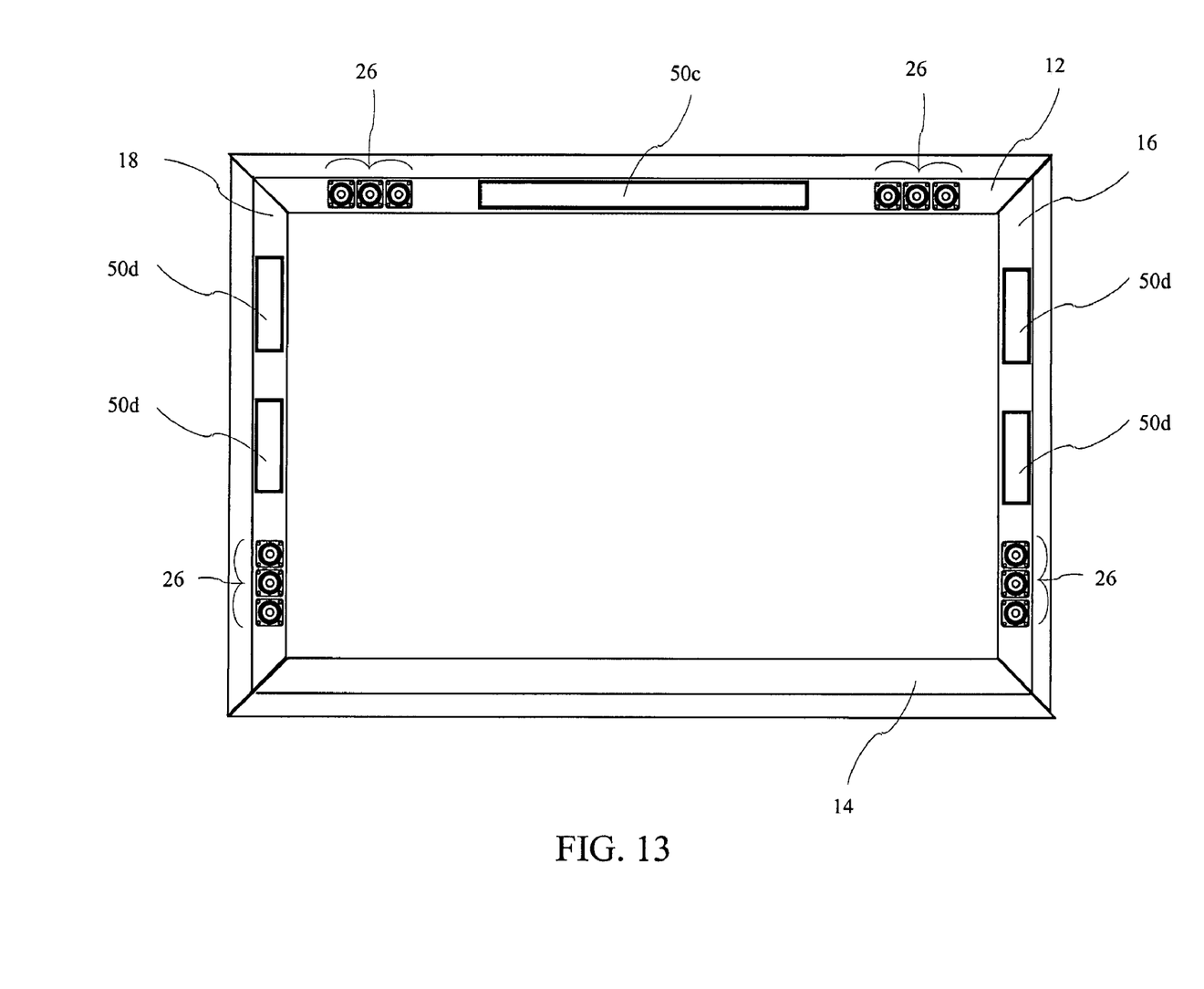
FIG. 13 is a frontal elevation view showing a flat panel monitor frame with two planar speakers residing in each of the speaker frame sides, a single planar speaker residing in the frame top, and conventional speakers residing in the frame sides and top.

FIG. 13 shows a flat panel monitor frame 10 with two planar speakers 50*d* residing in each of the speaker frame sides 16, 18, a single planar speaker 50*c* residing in the frame top 12, and conventional speakers 26 residing in the frame sides 16, 18 and top 12. At least one planar speaker, either 50*c* or 50*d*, further resides in the frame bottom 14. Further, the flat panel monitor frame 10*a*, as shown in FIGS. 9 and 10, further comprise the speaker arrangements as shown in FIGS. 11, 12, and 13.

Information, as herein shown and described in detail, is fully capable of attaining the above-described object of the invention, the presently preferred embodiment of the invention, and is, thus, representative of the subject matter which is broadly contemplated by the present invention. The scope of the present invention fully encompasses other embodiments which may become obvious to those skilled in the art, and is to be limited, accordingly, by nothing other than the appended claims, wherein reference to an element in the singular is not intended to mean "one and only one" unless explicitly so stated, but rather "one or more." All structural and functional equivalents to the elements of the above-described preferred embodiment and additional embodiments that are known to those of ordinary skill in the art are hereby expressly incorporated by reference and are intended to be encompassed by the present claims.

Moreover, no requirement exists for a device or method to address each and every problem sought to be resolved by the present invention, for such to be encompassed by the present claims. Furthermore, no element, component, or method step in the present disclosure is intended to be dedicated to the public regardless of whether the element, component, or method step is explicitly recited in the claims. However, various changes and modifications in form and fabrication material detail that maybe made without departing from the spirit and scope of the inventions as set forth in the appended claims should be readily apparent to those of ordinary skill in the art. No claim herein is to be construed under the provisions of 35 U.S.C. § 112, sixth paragraph, unless the element is expressly recited using the phrase "means for."

INDUSTRIAL APPLICABILITY

The present invention industrially applies to a mounting frame for a flat panel monitor, and more particularly, to a industrially applies to a monitor frame which is particularly well-suited for residential use, or use in any surroundings where an opulent or furniture-like use is desired. Preferably, the present invention industrially applies to home theater environments.

What is claimed:

1. A flat panel monitor frame, comprising:
   a plurality of frame sections suitable for bordering a flat panel monitor, the frame sections comprising: a frame top; a frame right side extending downward from the frame top; and a frame left side extending downward from the frame top, at least one section mountable on a wall independently of the flat panel monitor;
   at least one speaker residing in at least one of the frame sections; and
   a conductor for electrically coupling the at least one speaker to a source of at least one speaker signal associated with the flat panel monitor.

2. The flat panel monitor frame of claim 1, wherein the at least one speaker comprises at least one right speaker mounted in the frame right side and at least one left speaker mounted in the frame left side.

3. The flat panel monitor frame of claim 2, wherein the at least one speaker comprises at least one speaker chosen from the group of speakers comprising a ribbon speaker, a quasi-ribbon speaker, an electrostatic loudspeaker, a distributed mode loudspeaker, and a conventional speaker.

4. The flat panel monitor frame of claim 1, wherein the at least one speaker comprises at least one speaker chosen from the group of speakers comprising a ribbon speaker, a quasi-ribbon speaker, an electrostatic loudspeaker, a distributed mode loudspeaker, and a conventional speaker.

5. The flat panel monitor frame of claim 1, further including a at least one removable grill disposed over the at least one speaker.

6. The flat panel monitor frame of claim 1, wherein the at least one speaker is mounted in an aluminum extrusion.

7. The flat panel monitor frame of claim 1, wherein a planar speaker processing circuit resides in at least one frame section of the plurality of frame sections.

8. The flat panel monitor frame of claim 1, wherein each of the frame sections have at least one speaker mounted therein.

9. The flat panel monitor frame of claim 1, further including a frame bottom.

10. The flat panel monitor frame of claim 1, further including a removable replaceable trim.

11. The flat panel monitor frame of claim 10, wherein the removable replaceable trim comprises wood.

12. The flat panel monitor frame of claim 1, wherein each of the frame sections have at least one speaker mounted therein.

13. The flat panel monitor frame of claim 12, wherein the at least one speaker comprises at least one speaker chosen from the group of speakers comprising a ribbon speaker, a quasi-ribbon speaker, an electrostatic loudspeaker, a distributed mode loudspeaker, and a conventional speaker.

14. A frame system for a flat panel monitor, comprising:
   a frame including a speaker portion and a trim portion, the frame comprising: a frame top section; a frame right side section extending downward from the frame top; and a frame left side section extending downward from the frame, at least one section mountable on a wall;
   a back support board attached to the frame, said back support board adapted for supporting the flat panel monitor;
   a plurality of speakers residing in the speaker portion;
   a plurality of removable and replaceable grills disposed over the speaker portion; and
   a removable and replaceable trim disposed over the trim portion.

15. The flat panel monitor frame of claim 14, wherein the plurality of speakers comprises two or more speakers chosen from the group of speakers comprising a ribbon speaker, a quasi-ribbon speaker, an electrostatic loudspeaker, a distributed mode loudspeaker, and a conventional speaker.

16. The flat panel monitor frame of claim 15 further having an electronic circuit for power conditioning and audio/visual processing, said processing comprising one or more functions chosen from the list of functions comprising music and movie surround decoding, tuner functions, pre-amplifier functions, power amplifier functions, remote control receipt and processing, input signal selection, and display of control information on the flat panel monitor.

17. A speaker and frame system for a flat panel monitor, comprising:
   a frame comprising: a frame top section; a frame bottom section; a frame right side section connected between the frame top and the frame bottom sections; and a frame left side section connected between the frame top and the frame bottom sections; at least one section mountable on a wall;
   at least one right planar speaker housed in the frame right side;
   at least one left planar speaker housed in the frame left side; and
   at least one top planar speaker housed in the frame top.

18. The system of claim 17, further including at least one circuit for processing at least one speaker signal for the at least one right planar speaker, the at least one left planar speaker, and, the at least one top planar speaker.

* * * * *

UNITED STATES PATENT AND TRADEMARK OFFICE
CERTIFICATE OF CORRECTION

| | | |
|---|---|---|
| PATENT NO. | : 7,471,804 B2 | Page 1 of 1 |
| APPLICATION NO. | : 10/753066 | |
| DATED | : December 30, 2008 | |
| INVENTOR(S) | : Noel Lee | |

It is certified that error appears in the above-identified patent and that said Letters Patent is hereby corrected as shown below:

Column 8:
Please delete Claim 12 "The flatpanel monitor frame of claim 1, wherein each of the frame sections have at least one speaker mounted therein.", and replace with Claim 7 of the Response to Office Action -- The flat panel monitor frame of Claim 1, further including at least one removable grill disposed over the at least one speaker. --

Signed and Sealed this

Thirty-first Day of March, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,471,804 B2  
APPLICATION NO. : 10/753066  
DATED : December 30, 2008  
INVENTOR(S) : Noel Lee Page 1 of 1

It is certified that error appears in the above-identified patent and that said Letters Patent is hereby corrected as shown below:

Column 8, lines 12-14:
Please delete Claim 12 "The flatpanel monitor frame of claim 1, wherein each of the frame sections have at least one speaker mounted therein.", and replace with -- The flat panel monitor frame of Claim 1, further including at least one removable grill disposed over the at least one speaker. --

This certificate supersedes the Certificate of Correction issued March 31, 2009.

Signed and Sealed this

Twenty-first Day of April, 2009

JOHN DOLL  
*Acting Director of the United States Patent and Trademark Office*